United States Patent [19]

Shirai

[11] 4,405,208
[45] Sep. 20, 1983

[54] LIQUID CRYSTAL DISPLAY DEVICES WITH POLYIMIDE-SILOXANE COPOLYMER RESIN ALIGNMENT FILM

[75] Inventor: Yoshihiro Shirai, Tsurumaihigashimachi, Japan

[73] Assignee: Sharp Kabushiki Kaisha, Osaka, Japan

[21] Appl. No.: 230,541

[22] Filed: Feb. 2, 1981

[30] Foreign Application Priority Data

Feb. 8, 1980 [JP] Japan ................. 55-14937

[51] Int. Cl.³ .............................. G02F 1/13
[52] U.S. Cl. ......................... 350/341; 428/1
[58] Field of Search ................. 350/340, 341

[56] References Cited

U.S. PATENT DOCUMENTS 4,273,420  6/1981  Watanabe et al. ............... 350/341
4,358,391  11/1982  Finkelman et al. ............... 350/341

FOREIGN PATENT DOCUMENTS 49-56651  11/1974  Japan ................. 350/340
54-49155  4/1979  Japan ................. 350/340
54-79414  6/1980  Japan ................. 350/341

*Primary Examiner*—John K. Corbin
*Assistant Examiner*—David Lewis
*Attorney, Agent, or Firm*—Hubbell, Cohen, Stiefel & Gross

[57] ABSTRACT

There provides a liquid crystal display device which comprises a pair of opposed substrates, a transparent electrode on at least one of the substrates, a liquid crystal composition and a characteristic orienting film of a polyimide-siloxane copolymer resin formed at least over the surface of the electrode, and which shows an excellent orientation.

14 Claims, 3 Drawing Figures

LIQUID CRYSTAL DISPLAY DEVICES WITH POLYIMIDE-SILOXANE COPOLYMER RESIN ALIGNMENT FILM

BACKGROUND OF THE INVENTION

1. Field of the Invention

This invention relates to a liquid crystal display device, and more particularly to liquid crystal display devices applied for specific orienting films.

2. Description of the Prior Arts

Liquid crystal display devices are produced usually by preparing a pair of glass plates bearing transparent electrodes arranged in the pattern of picture elements, spacing the glass places face-to-face at a distance of 5 μm to 100 μm to obtain a sandwich cell, placing a liquid crystal composition into the cell and sealing the cell. The photoelectric characteristics of the liquid crystal cell is dependent largely on the orientation of the liquid crystal within the cell. Especially with liquid crystal display devices which operate under the action of an electric field (FEM liquid crystal display devices), there is required to show a uniform liquid crystal orientation. The orientation of the liquid crystal is usually controlled by a surface treatment of the cell, or by adding a very small amount of a chemical substance to the liquid crystal. As a mode of orientation, the liquid crystal molecules are aligned with their axes parallel to the substrate plane (homogeneous alignment) by rubbing the surface of the substrate with paper or fibers, or by forming an orienting film of oblique-deposited $SiO_2$ on the substrate surface, while research has been conducted in recent years on the method of obtaining the desired orientation by preparing an orienting film form an organic high polymer and rubbing the film. This method appears very useful in view of the uniformity of the orientation available and the simplicity of the procedure.

Useful organic high polymers heretofore proposed for preparing orienting films for FEM liquid crystal display devices include polyimide (see Japanese Published Unexamined Patent Application No. 65960/1976), polyimideisoindoloquinazolinedione (see Japanese Published Unexamined Patent Application No. 30859/1979) and polyimidebenzoimidazopyrrolone (see Japanese Patent Application Disclosure No. 133359/1979). The orienting films prepared from such polymers followed by rubbing treatment induce a uniform orientation on liquid crystals, have high heat resistance and good insulating properties and will not readily permit erasion of the orientation even when heated to 100° to 150° C. for sealing. However, such conventional films of organic high polymers still fail to sufficiently inhibit the occurrence of reverse-tilt disclination (appearance of a domain of different viewing angles upon application of voltage). Additionally these films are not fully resistant to abrasion and are prone to wear over the surface when rubbed, so that when it is desired to produce an orienting film of a given thickness, the polymeric film to be subjected to the rubbing treatment must be prepared with a sufficiently larger thickness. In this case, nevertheless, difficulties are still encountered in obtaining a uniform orienting film with high reproducibility, consequently leading to the drawback that the resulting film involves variations in various properties.

SUMMARY OF THE INVENTION

The main object of this invention is to form an orienting film from polyimide-siloxane copolymer resin having silcon atoms on the inner surface of a liquid crystal cell, the orienting film having outstanding orienting properties, heat resistance and insulating properties and also good characteristics in abrasion resistance and in inhibiting occurrence of reverse-tilt disclination.

According to this invention, it provides a liquid crystal display device comprising a pair of opposed substrates, a transparent electrode provided on at least one of the substrates and a liquid crystal composition sandwiched between the substrates, an orienting film of polyimide-siloxane copolymer resin being formed at least over the surface of the electrode which is on the substrate and is to be in contact with the liquid crystal composition.

The orienting film according to this invention is superior to the conventional high polymer orienting films in abrasion resistance and in inhibiting occurrence of reverse-tilt disclination. Accordingly the present film induces more uniform and outstanding orientation than the conventional polymeric orienting films, readily affording the desired display pattern. Further when rubbing treatment is resorted to, the invention provides an orienting film of smaller thickness than heretofore possible, and that with good reproducibility and with a reduced voltage loss for the liquid crystal cell, hence advantageous.

Generally the factors closely related to the thickness of orienting films of organic high polymer for FEM liquid crystal display devices include photoelectric characteristics, color of the cell, disappearance of the electrode pattern and insulating properties. In view of these factors, the film thickness is limited usually to the range of 100 to 1200 Å if it is desired to render the liquid crystal display device usable both for static drive and for dynamic drive. With the known orienting films of high polymer which have low abrasion resistance, it was difficult to obtain a uniformly controlled film thickness by rubbing treatment. Especially difficulty has been experienced in obtaining uniform and small film thicknesses which are desireable for dynamic drive. The orienting film of this invention, which is highly abrasion-resistant, remains almost unchanged in its thickness despite the rubbing treatment and substantially retains the initial thickness as made from the high polymer. For this reason, the film thickness is controllable as desired with good reproducibility over a wide range including the foregoing range of 100 to 1200 Å. The invention is especially advantageous in that a film of small and uniform thickness is available with ease.

Reverse-tilt disclination is liable to occur when the known orienting films of organic high polymers are used for liquid crystal cells of the twisted nematic type which have such a pattern that the rubbing directions for a pair of electrodes intersect at an acute angle, whereas this objectionable phenomenon can be inhibited with use of the orienting film of the invention regardless of the film thickness or the type of the liquid crystal. Liquid crystal displays are therefore available with various complex patterns.

DESCRIPTION OF THE PREFERRED EMBODIMENTS

Figure 1:
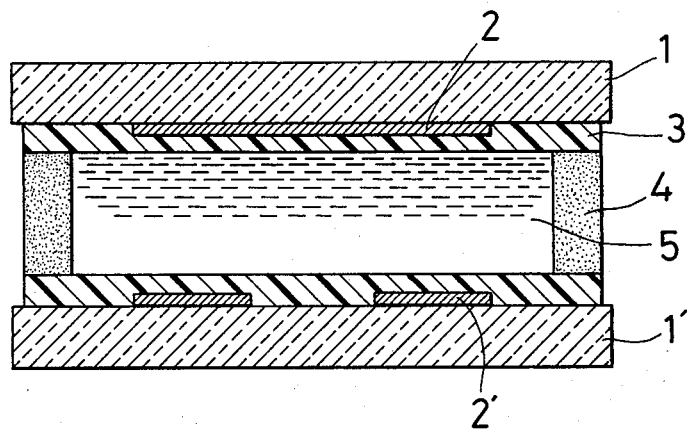
FIG. 1 is a sectional view showing the basic structure of the liquid crystal display device of this invention.

With reference to FIG. 1 showing the basic construction, the liquid crystal display device of this invention consists essentially of a display substrate 1 bearing a transparent electrode 2, an opposed substrate 1' facing the display substrate 1 and bearing an opposed electrode 2', a liquid crystal composition 5 sandwiched between the substrates, and a sealing member 4.

According to this invention, an orienting film 3 of polyimide-siloxane copolymer resin is formed on at least one surface of each of the electrodes.

The polyimide-siloxane copolymer resin as the orienting film of the invention is produced by copolymerizing, in an organic solvent, a diaminosiloxane having the formula (I):

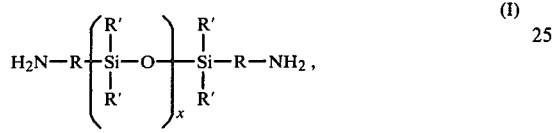

wherein R is a bivalent organic group, R' is a monovalent organic group and x is an integer from 1 to 4, with a diamine having the formula (II):

$$H_2N-Q-NH_2, \quad (II)$$

wherein Q is a bivalent organic group free from silicon atom, and a tetracarboxylic acid dianhydride having the formula (III)

wherein R" is a tetravalent organic group,
to yield a polyamido acid-siloxane copolymer resin, and heating it to occur an internal condensation.

In the above mentioned formula (I), concrete examples of the group R are alkylene groups such as methylene, ethylene, propylene, butylene, amylene, methylpropylene or hexylene group; alkenylene groups such as vinylene or propenylene group; arylene groups such as phenylene, naphthylene, phenanthrylene, anthrylene, indenylene, biphenylene, methylphenylene, dimethylphenylene, trimethylphenylene, ethylphenylene, chlorophenylene, aminophenylene or 1,2,4,5-tetramethylphenylene group; aralkylene groups such as benzylidene, styrylidene, cinnamylidene, cuminylidene, phenylethylene, phenylpropylene, phenylbutylene or naphtylethylene group; cycloalkylene groups such as cyclopropylene, cyclobutylene, cyclopentylene, cyclohexylene, cycloheptylene, cyclopentylidene, cyclohexylidene or cycloheptylidene group; heterocyclic alkylene groups such as furfurylidene, indolylidene group; halo-alkylene group such as tetrafluoroethylene or monobromobutylen; or other groups such as —CH$_2$CH$_2$NHCH$_2$—, —CH$_2$OCH$_2$CH$_2$CH$_2$—, —CH$_2$CH$_2$SCH$_2$CH$_2$— or —CH$_2$CH$_2$NHCH$_2$CH$_2$CH$_2$—. Also, concrete examples of the group R' are alkyl, alkenyl or aryl groups such as methyl, ethyl, butyl, octyl, vinyl, alkyl, phenyl, xylyl, naphthyl or tolyl group; haloalkyl, haloalkenyl or haloaryl group such as 3,3,3-trifluoropropyl, chlorophenyl, bromophenyl, γ-chlorobutyl or dichlorophenyl group: hydrolyzable organic groups such as alkoxy, aryloxy or acyloxy group (for example methoxy, isopropoxy, butoxy, phenoxy, acetoxy, propionyloxy or benzoyloxy group).

Preferred concrete examples of the diaminosiloxane (I) are;

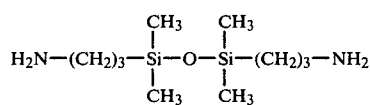

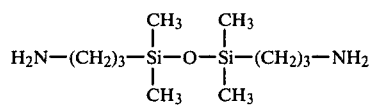

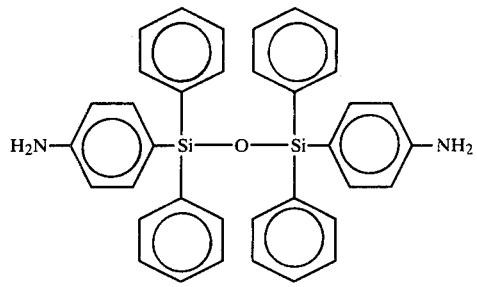

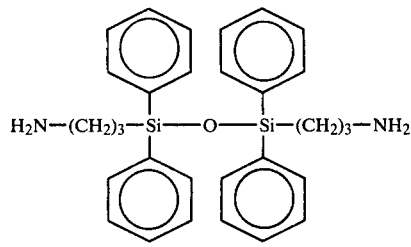

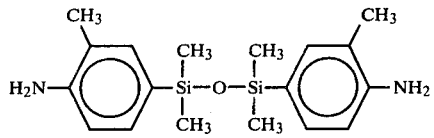

Concrete examples of the diamine (II) are m-phenylenediamine, p-phenylenediamine, 4,4'-diaminodiphenylpropane, 4,4'-diamino-diphenylmethane, benzidine, 4,4'-diamino-diphenylsufide, 4,4-diamino-diphenylsulfone, 3,3'-diamino-diphenylsulfone, 4,4'-diaminodiphenylether, 2,6-diamino-pyridine, bis(4-aminophenyl)phosphine oxide, bis(4-aminophenyl)-N-methyl amine, 1,5-diamino-naphthalene, 3,3'-dimethyl-4,4'-diamino-biphenyl, 3,3'-dimethoxybenzidine, 2,4-bis(β-amino-t-butyl)toluene, bis-(p-β-amino-t-butylphenyl)ether, p-bis(2-methyl-4-aminophenyl)benzene, p-bis-(1,1-dimethyl-5-aminopentyl)benzene, m-xylylenediamine, p-xylylenediamine, bis(p-aminocyclohexyl)methane, ethylenediamine, propylenediamine, hexamethylenediamine, heptamethylenediamine, octamethylenediamine, nonamethylenediamine, decamethylenediamine, 3-methylheptamethylenediamine, 4,4'-dimethyl-heptamethylenediamine, 2,11-diaminododecane, 1,2-bis(3-aminopropoxy)ethane, 2,2-dimethylpropylene diamine, 3-methoxy-hexamethylenediamine, 2,5-dimethyl-hexamethylenediamine, 5-methyl-nonamethylene diamine, 1,4-diaminocyclohexane, 1,12-diamino-octadecane or 2,5-diamino-1,3,4-oxadiazole.

Other examples of the group Q in the diamine (II) are ethylene, propylene, hexylene, ethyleneoxyethylene, ethyleneoxypropylene, propyleneoxypropylene, phenylene, naphthylene, biphenylene or anthrylene group or a group of the formula:

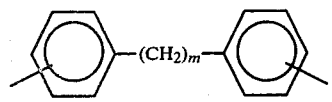

wherein m is an integer from 1 to 10.

In the formula (III), concrete examples of the group R" are those represented by the formulas:

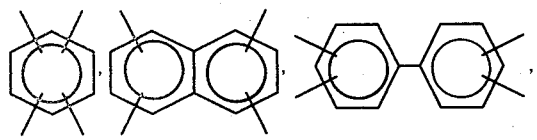

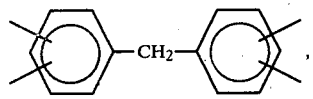

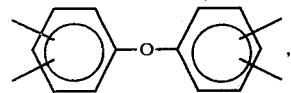

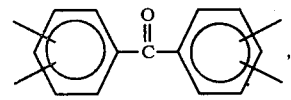

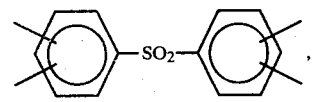

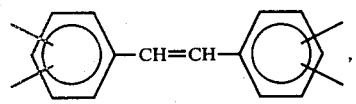

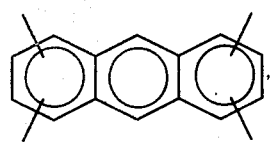

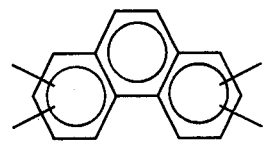

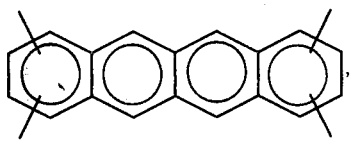

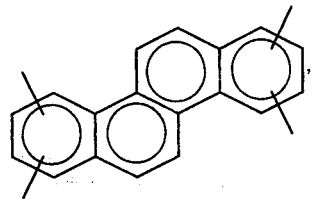

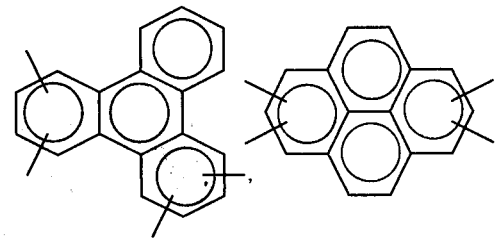

Concrete examples of the tetracarboxylic acid dianhydride (III) are pyromellitic acid dianhydride, mellitic acid dianhydride, 2,3,6,7-naphthalenetetracarboxylic acid dianhydride, 1,2,5,6-naphthalenetetracarboxylic acid dianhydride, 3,3',4,4'-diphenyltetracarboxylic acid dianhydride, 3,3',4,4'-diphenylmethanetetracarboxylic acid dianhydride, bis(3,4-dicarboxyphenyl)ether dianhydride, bis(3,4-dicarboxyphenyl)sulfone dianhydride, 3,3',4,4'-benzophenonetetracarboxylic acid dianhydride, 2,3,6,7-anthracenetetracarboxylic acid dianhydride, 1,2,7,8-phenanthrenetetracarboxylic acid dianhydride, 2,3,6,7-naphthalenetetracarboxylic acid dianhydride, 2,3,8,9-chrysenetetracarboxylic acid dianhydride, 2,3,6,7-triphenylenetetracarboxylic acid dianhydride, 3,4,9-perylenetetracarboxylic acid dianhydride, 1,2,7,8-coronenetetracarboxylic acid dianhydride, 1,8,4,5-naphthalenetetracarboxylic acid dianhydride or the like.

Furthermore, the compounds (I), (II) and (III) may be used in their respective admixture.

In the copolymerization of the compounds (I), (II) and (III), in an organic solvent, the molar ratio of (I) plus (II):(III) is suitable to about 1:1, in order to obtain a final product having a desirable structure of polyimide ring. In case where said molar ratio is outside the above range, the resulting orienting film will be insufficient in heat resistance, insulating properties and orientation. Also, the molar ratio of (I) and (II) to be used in the copolymerization is suitable to be 0.5:9.5–2.0:8.0, preferably 1:9. When a quantity of diaminosiloxane (I) is less, the resulting orienting film will lack sufficient abrasion resistance. On the other hand, in case where a quantity of (I) is large, the resulting orienting film will be insufficient to heat resistance.

The reaction conditions of the copolymerization and the organic solvent are suitably selected and utilized from those known in the arts.

The resulting polyamido acid-siloxane copolymer believed to be composed by the following two unit structures:

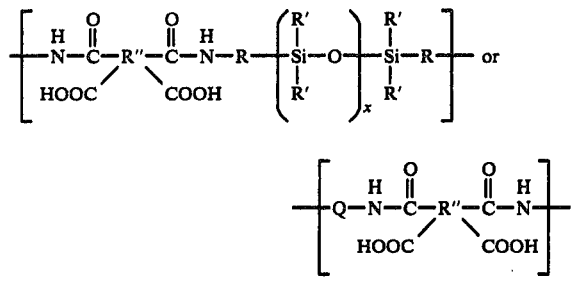

Upon heating of the polyamido acid-siloxane copolymer, it is internally condensed to form the desired polyimide-siloxane copolymer resin, which is believed to be composed by the following two unit structures:

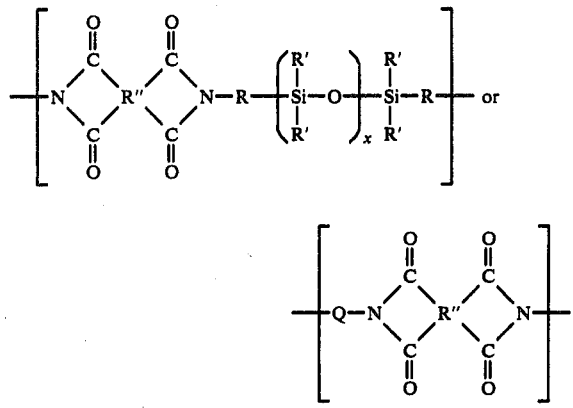

However, as explained below, the polyamido acid-siloxane copolymer in an organic solvents is conveniently and usually used for appling for the substrates, followed by heating to form the required polyimide-siloxane copolymer resin.

Usual liquid crystal compositions such as cyclohexane, biphenyl, azoxy, ester or pyrimidine type may be used as the liquid crystal compositions of the invention. These compositions may include additives such as dopants or homeotropic aligning agents.

Examples of materials used for the substrates of the liquid crystal cell of this invention are glass, ceramics, semiconductors, plastics, etc. Glass substrates are generally suitable for bearing the transparent electrode thereon.

At least one of the electrodes of the liquid crystal cell of the invention is a transparent electrode, for which ITO film (main ingredient: $In_2O_3$) measuring 300 to 500 Å in thickness and NESA film (main ingredient: $SnO_2$) are usually used. The other electrode may be of the reflective type made of aluminum or the like. The combination of the substrate and the electrode is specifically determined, typically depending on whether the cell is of the transmissive type or of the reflective type.

According to the invention, the thickness of the orienting film of polyimide-siloxane copolymer resin is determined in view of photoelectric characteristics, color of the cell, disappearance of the electrode pattern and insulating properties. The film thickness usable both for static drive and for dynamic drive is usually 100 to 1200 Å. In the case of static drive (for digital watches, etc.), it is most desirable to disappear the transparent electrode pattern from the viewpoint of design and the like. Thus it is desired to adjust the film thickness to an optical thickness equal to that of the transparent electrode. Since the ITO film has a refractive index of 1.8 to 1.9, the first range of film thickness where the electrode pattern disappears is 800 to 1200 Å, and the second film thickness range is 2600 to 3000 Å, and the disappearance of the pattern is almost independent of the type of the liquid crystal composition. However, the range of 2600 to 3000 Å involves an increased voltage loss and is not desirable, so that the film thickness of 800 to 1200 Å is most preferable. For dynamic drive, especially outstanding photoelectric characteristics are required. The thinner the orienting film, the better are the characteristics. In this case the film thickness of 100 to 500 Å is preferred, with the insulating properties also taken into account.

With the known high polymer films which have poor abrasion resistance, it is difficult to obtain an uniform film thickness by rubbing. Examples to follow reveal that conventional films even with a thickness of 1500 A fail to fully survive after the rubbing treatment and that the resulting films are uneven, further indicating that those with a thickness of up to 500 Å are unfit for use. On the other hand, the orienting film of this invention, which has high abrasion resistance, undergoes little or no variation in thickness when subjected to rubbing treatment and is therefore controllable to the desired thickness in the foregoing range with good reproducibility. Especially the invention easily gives uniform and small film thicknesses which are difficult to obtain by the prior art.

The film of polyimide-siloxane copolymer resin can be formed in the following way. For example, a solution of the aforementioned polyamido acid-siloxane copolymer resin in an organic solvent (such as N,N-dimethylacetamide, N-methyl-2-pyrrolidone or the like) is applied to the surface of substrate including an electrode, and after drying the coating is heated in an inert gas for internal condensation to form a polyimide ring. The resin solution is applicable with a spinner, roll coater or brush, or by dipping or offset printing. The film thickness is controllable as described above and as desired by varying the resin concentration of the organic solvent solution or by using a suitable method of coating. When a low-boiling organic solvent is used, it is suitable to use a spinner or the dipping method, while when a high-boiling organic solvent is used, the solution is suitably applicable by offset printing or roll coater. The dipping and offset printing methods are preferred for quantity production. The coating is dried usually at 100° to 200° C. for about 30 minutes for the removal of the solvent. The dried coating is heated in an inert gas at 250° to 400° C. for 20 minutes to 2 hours.

The copolymer resin film thus obtained is rubbed in a known manner to obtain an orienting film. This is followed by printing of seal, printing of a conductive paste, curing of the seal and injection of the liquid crystal composition in succession. The assembly is finally sealed off, whereby a liquid crystal display device is obtained according to the invention.

Whereas the liquid crystal display devices incorporating the conventional polymeric orienting film are prone to the occurrence of reverse-tilt disclination, such a trouble is inhibited with the device of the invention. Accordingly the desired liquid crystal display device can be provided with a complex pattern. Further such characteristics are not dependent on the thickness of the orienting film or on the type of the liquid crystal composition, hence advantageous. The orienting film of the invention is further comparable to the high polymer orienting films of the prior art in orienting properties, heat resistance and insulating properties. The present orienting film is also useful for homogeneous alignment for use in liquid crystal display devices of the hybrid type involving homogeneous alignment and homeotropic alignment in opposed relationship.

The invention will be described in greater detail with reference to the following examples which, however, are in no way limitative.

EXAMPLE 1

Evaluation test for abrasion resistance

The films of polyimide-siloxane copolymer resins given below were evaluated in respect of abrasion resistance in terms of the variation in the film thickness resulting from rubbing treatment. For the evaluation, each of the films was prepared with thicknesses of 500, 1000 and 1500 Å before rubbing. The variation in the film thickness was determined with the unaided eye.

Preparation of polyimide-siloxanes

1. Pyromellitic dianhydride, 4,4'-diaminodiphenyl ether and bis(p-aminophenyl)tetraphenyl disiloxane of the formula (A):

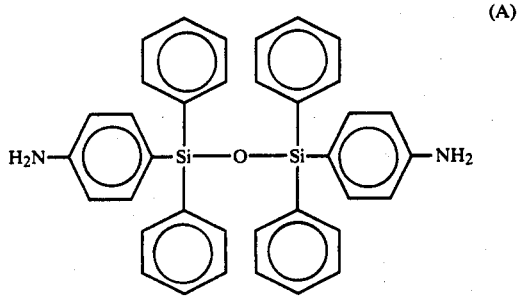

(A)

were copolymerized in a mole ratio of 1:0.9:0.1 to prepare a polyamido acid-siloxane copolymer resin, which was then dissolved in N,N'-dimethylacetamide to obtain a solution having a concentration of 5 wt. %. The solution was applied by a spinner to a glass substrate bearing an electrode of ITO film, to a specified film thickness, then dried and thereafter heated at 280° C. for 25 minutes. In this way, three films of polyimide-siloxane copolymer resin (abbreviated as POLYIMIDE-SILOXANE I) were prepared, 500, 1000 and 1500 Å in thickness.

2. Pyromellitic dianhydride, 3,3',4,4'-benzophenonetetracarboxylic dianhydride, p,p'-diaminodiphenylmethane and bis(3-aminopropyl)tetramethyl disiloxane of the formula (B):

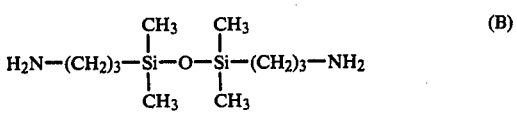

(B)

were copolymerized in a mole ratio of 0.5:0.5:0.9:0.1 to obtain a resin. The same procedure as above was thereafter repeated with use of the resin to prepare three films of polyimide-siloxane copolymer (abbreviated as POLYIMIDE-SILOXANE II), 500, 1000 and 1500 Å in thickness.

3. 3,3',4,4'-benzophenonetetracarboxylic dianhydride, p,p'-diaminodiphenylmethane and the diaminosiloxane of the formula (B) were copolymerized in a mole ratio of 1:09:0.1 to obtain a resin. Following the same procedure as above with use of the resin, three films of polyimide-siloxane copolymer resin (abbreviated as POLYIMIDE-SILOXANE III) were prepared with thicknesses of 500, 1000 and 1500 Å.

POLYIMIDE-SILOXANE I, II and III were evaluated with the results shown in Table 1, which also gives the results of Comparison Example 1.

COMPARISON EXAMPLE 1

In the same manner as in Example 1, the following polymer films were evaluated in respect of abrasion resistance.

1. Three polyimide films, 500, 1000 and 1500 Å in thickness (abbreviated as POLYIMIDE I), were prepared in the same manner as in Example 1, using a resin obtained by copolymerizing pyromellitic dianhydride and 4,4'-diaminodiphenyl ether in a mole ratio of 1:1.

2. Pyromellitic dianhydride, 3,3',4.4'-benzophenonetetracarboxylic dianhydride and 3,3'-diamino-4-ethoxycarbonylaminodiphenyl ether were copolymerized in a mole ratio of 1:1:2 to obtain a resin, from which three films of polyimide-benzoimidazopyrrolone (abbreviated as POLYIMIDE II) were prepared in the same manner as in Example 1.

3. Pyromellitic dianhydride, 3,3',4,4'-benzophenonetetracarboxylic dianhydride, 4,4'-diaminodiphenylether-3-carboxylic amide and 4,4'-diaminodiphenyl ether were copolymerized in a mole ratio of 0.5:0.5:0.1:0.9 to obtain a resin, from which three films of polyimideisoindoloquinazolinedione (abbreviated as POLYIMIDE III) were prepared in the same manner as in Example 1.

TABLE 1

| | Kind of film | Film thickness before rubbing | Abrasion resistance |
|---|---|---|---|
| Example 1 | POLYIMIDE—SILOXANE I | 500 | Excellent |
| | | 1000 | Excellent |
| | | 1500 | Excellent |
| | POLYIMIDE—SILOXANE II | 500 | Excellent |
| | | 1000 | Excellent |
| | | 1500 | Excellent |
| | POLYIMIDE—SILOXANE III | 500 | Excellent |
| | | 1000 | Excellent |
| | | 1500 | Excellent |
| Comparison | POLYIMIDE I | 500 | Poor |

TABLE 1-continued

| Kind of film | | Film thickness before rubbing | Abrasion resistance |
|---|---|---|---|
| Example 1 | | 1000 | Poor |
| | | 1500 | Fair |
| | POLYIMIDE II | 500 | Poor |
| | | 1000 | Fair |
| | | 1500 | Good |
| | POLYIMIDE III | 500 | Poor |
| | | 1000 | Fair |
| | | 1500 | Good |

Criteria of evaluation

Poor: The film of the glass substrate was almost completely worn away, with small portions of the film remaining on the ITO film.
Fair: The film was considerably worn away over the glass substrate and slightly over the ITO film.
Good: The film was slightly worn away over the glass substrate but remained almost unchanged over the ITO film.
Excellent: No change in the film over the glass substrate or over the ITO film.

EXAMPLE 2

Test of occurrence of reverse-tilt disclination

Figure 2:
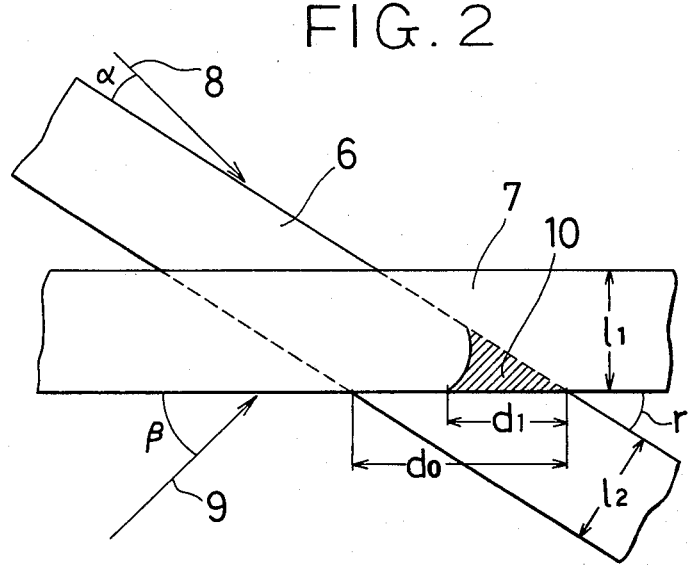
FIG. 2 is a plan view showing a pair of intersecting electrodes for use in Example 2.

Liquid crystal cells were fabricated with an electrode pattern susceptible to reverse-tilt disclination, and the orienting films of the invention were checked for the occurrence of reverse-tilt disclination. FIG. 2 shows the construction of the cells. A glass substrate was prepared which had an ITO electrode 6 in the form of a thin strip, 400 Å in thickness and 1 mm in widthwise length $l_2$ and an orienting film, the rubbing direction 8 of which was at an angle of 15° ($\alpha$) with respect to the longitudinal direction of the electrode 6. Another glass substrate was prepared which had an ITO electrode 7 similarly in the form of a thin strip, 400 Å in thickness and 1 mm in widthwise length $l_1$ and an orienting film, the rubbing direction 9 of which was at an angle of 45° ($\beta$) with respect to the length of the electrode 7. The substrates were opposed to each other at a spacing of 7 μm, with the electrodes intersecting each other at an angle of 30° ($\gamma$), and the space between the opposed portions was sealed with an epoxy resin along the edges of the space. Subsequently a biphenyl type liquid crystal composition was injected into the space through an inlet, which was thereafter sealed off with resin.

The orienting films had a thickness of 800 Å after rubbing and were prepared from POLYIMIDE-SILOXANE I, II and III in the same manner as in Example 1.

Generally the acute angle portion 10 of the rhombic area where the two electrodes insersect is prone to the occurrence of reverse-tilt disclination.

The liquid crystal cell was maintained at 50° C., and voltage was applied thereto at 4.3 V r.m.s., 100 Hz for 24 hours. Table 2 shows the degree of reverse-tilt disclination that occurred, along with the results observed in Comparison Example 2.

Figure 3:
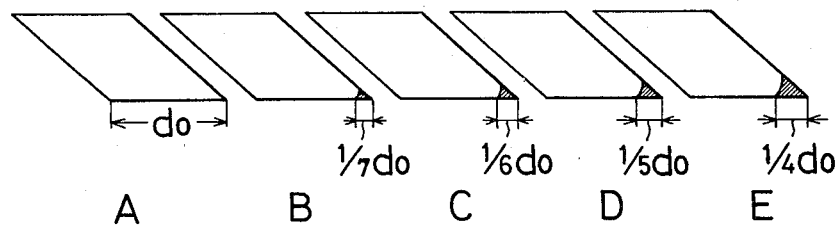
FIG. 3 is a diagram illustrating the criteria used in Example 2 for evaluating the degree of occurrence of reverse-tilt disclination.

The degree was determined in terms of the ratio of the side length $d_1$ of the region where reverse-tilt disclination occurred in the electrode intersecting rhombic area shown in FIG. 2, to the side length $d_0$ of the rhombic area, namely, $d_1/d_0$. The results were evaluated according to the following criteria as seen in FIG. 3.
A: No reverse-tilt disclination.
B: $d_1/d_0 = 1/7$.
C: $d_1/d_0 = 1/6$.
D: $d_1/d_0 = 1/5$.
E: $d_1/d_0 = \frac{1}{4}$.

COMPARISON EXAMPLE 2

The same procedure as in Example 2 was repeated except that the three kinds of copolymer resins of Comparison Example 1 were used in place of POLYIMIDE-SILOXANE I to II for the determination of the degree of reverse-tilt disclination occurred. Table 2 shows the results.

TABLE 2

| | Kind of film | Degree of reverse-tilt disclination |
|---|---|---|
| Example 2 | POLYIMIDE—SILOXANE I | A |
| | POLYIMIDE—SILOXANE II | A |
| | POLYIMIDE—SILOXANE III | A |
| Comparison | POLYIMIDE I | D |
| Example 2 | POLYIMIDE II | C |
| | POLYIMIDE III | C |

EXAMPLE 3

POLYIMIDE-SILOXANE I, II and III, which were found effective in inhibiting reverse-tilt disclination in Example 2, were further tested similarly for the occurrence of disclination, using films of varying thicknesses. Table 3 shows the results.

TABLE 3

| Film thickness (μm) | Degree of reverse-tilt disclination |
|---|---|
| 200 | A |
| 500 | A |
| 1000 | A |
| 1500 | A |

Thus it was found that the orienting films of the invention, having thicknesses in the usual range, did not permit occurrence of reverse-tilt disclination, irrespective of the thickness.

EXAMPLE 4

An orienting film of POLYIMIDE-SILOXANE I, 800 Å in thickness, was tested in the same manner as in Example 2 with the exception of using liquid crystals of the cyclohexane type, azoxy type and ester type. Table 4 shows the results.

TABLE 4

| Type of liquid crystal composition | Degree of reverse-tilt disclination |
|---|---|
| cyclohexane type | A |
| azoxy type | A |

TABLE 4-continued

| Type of liquid crystal composition | Degree of reverse-tilt disclination |
|---|---|
| ester type | A |

Thus it was found that the occurrence of reverse-tilt disclination were inhibited with use of the present film regardless of the type of usual liquid crystal compositions.

What is claimed is:

1. A liquid crystal display device comprising a pair of opposed substrates, a transparent electrode provided on at least one of the substrates, a liquid crystal composition sandwiched between the substrates and an orienting film of a polyimide-siloxane copolymer resin formed at least over the surface of the electrode which is on the substrate, said orienting film being in contact with the liquid crystal composition.

2. A liquid crystal display device as claimed in claim 1, wherein the polyimide-siloxane copolymer resin is formed by copolymerizing, in an organic solvent, a diaminosiloxane having the formula (I):

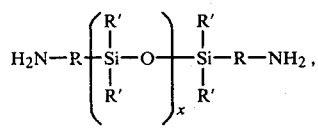

wherein R is a bivalent organic group, R' is a monovalent organic group and x is an integer from 1 to 4, with a diamine having the formula (II):

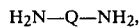

wherein Q is a bivalent organic group which does not contain a silicon atom, and a tetracarboxylic acid diahydride having the formula (III):
and a tetracarboxylic acid dianhydride having the formula (III):

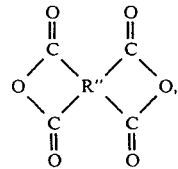

wherein R" is a tetravalent organic group, to yield a polyamido acid-siloxane copolymer resin, and subjecting it to an internal condensation under heating.

3. A liquid crystal display device as claimed in claim 2, wherein the molar ratio of the diaminosiloxane (I) plus the diamine (II): the tetracarboxylic acid dianhydride (III) is 1:1.

4. A liquid crystal display device as claimed in claim 3, wherein the molar ratio of the diaminosiloxane (I) and the diamine (II) is 0.5:9.5-2.0:8.0.

5. A liquid crystal display device as claimed in claim 4, wherein the molar ratio of the diaminosiloxane (I) and the diamine (II) is 1:9.

6. A liquid crystal display device as claimed in any of claims 2-5, wherein the diaminosiloxane (I) is bis(p-aminophenyl)tetraphenyl disiloxane, the diamine (II) is 4,4'-diaminodiphenyl ether and the tetracarboxylic acid dianhydride (III) is pyromellitic dianhydride.

7. A liquid crystal display device as claimed in any of claims 2-5, wherein the diaminosiloxane (I) is bis(3-aminopropyl)tetramethyl disiloxane, the diamine (II) is p,p'-diaminodiphenylmethane and the tetracarboxylic acid dianhydride (III) is a mixture of pyromellitic dianhydride and 3,3',4,4'-benzophenonetetracarboxylic dianhydride.

8. A liquid crystal display device as claimed in any of claims 2-5, wherein the diaminosiloxane (I) is bis(3-aminopropyl)tetramethyl disiloxane, the diamine (II) is p,p'-diaminodiphenylmethane and the tetracarboxylic acid dianhydride (III) is 3,3',4,4'-benzophenonetetracarboxylic dianhydride.

9. A liquid crystal display device as claimed in any of claims 2-5, wherein the polyamido acid-siloxane copolymer resin in solution with an organic solvent is applied to the surface of the electrode to form a coating, the coating is thereafter heated, thereby forming the orienting film of the polyamide-siloxane copolymer resin.

10. A liquid crystal display device as claimed in any of claims 2-5, wherein the thickness of the orienting film of polyimide-siloxane copolymer resin is 100-1200 A.

11. A liquid crystal display device as claimed in any of claims 2-5, wherein the thickness of the orienting film is 100-500 A.

12. A liquid crystal display device as claimed in any of claims 2-5, wherein the thickness of the orienting film is 800-1200 A.

13. A liquid crystal display device according to claim 1, wherein a pair of opposed electrodes are provided on each of said opposed substrates, and at least one of said electrodes being transparent.

14. A liquid crystal display device comprising a pair of opposed substrates, a pair of opposed transparent electrodes provided on each of said opposed substrates, a liquid crystal composition sandwiched between the opposed substrates, an orienting film of a polyimide-siloxane copolymer resin formed on the surfaces of the opposed electrodes, said orienting film being in contact with the liquid crystal composition, and a sealing member extending between the opposed substrates and forming together with said opposed substrates and enclosed cavity for housing said liquid crystal composition.

* * * * *